US012140140B2

(12) United States Patent
Sulzer

(10) Patent No.: US 12,140,140 B2
(45) Date of Patent: Nov. 12, 2024

(54) ALIGNING RECIPROCATING MOTION IN FLUID DELIVERY SYSTEMS

(71) Applicant: Wagner Spray Tech Corporation, Plymouth, MN (US)

(72) Inventor: Christopher J. Sulzer, St. Louis Park, MN (US)

(73) Assignee: Wagner Spray Tech Corporation, Plymouth, MN (US)

(*) Notice: Subject to any disclaimer, the term of this patent is extended or adjusted under 35 U.S.C. 154(b) by 807 days.

(21) Appl. No.: 15/223,212

(22) Filed: Jul. 29, 2016

(65) Prior Publication Data

US 2018/0030967 A1 Feb. 1, 2018

(51) Int. Cl.

| | |
|---|---|
| ***F04B 9/04*** | (2006.01) |
| ***B05B 9/00*** | (2006.01) |
| ***B05B 9/04*** | (2006.01) |
| ***F04B 17/06*** | (2006.01) |
| ***F04B 19/22*** | (2006.01) |

(52) U.S. Cl.

CPC .............. *F04B 9/045* (2013.01); *B05B 9/007* (2013.01); *B05B 9/0413* (2013.01); *F04B 17/06* (2013.01); *F04B 19/22* (2013.01)

(58) Field of Classification Search

CPC .......... F04B 9/045; F04B 19/22; F04B 17/06; B05B 9/0413; B05B 9/007

See application file for complete search history.

(56) References Cited

U.S. PATENT DOCUMENTS 1,858,817 A * 5/1932 Carrey .................... F04B 29/00 184/18
2,344,808 A * 3/1944 Duffield .................. F16B 21/12 403/146
2,362,525 A * 11/1944 Ashton ................. F04B 53/144 74/44

(Continued)

FOREIGN PATENT DOCUMENTS

CN 103375383 A 10/2013
DE 4314132 A1 * 11/1994 ............ F04B 53/146

(Continued)

OTHER PUBLICATIONS

Machine Translation of Description for DE4314132A1 dated Nov. 3, 1994 (Year: 1994).*

(Continued)

*Primary Examiner* — Nathan C Zollinger
(74) *Attorney, Agent, or Firm* — Christopher J. Volkmann; Kelly, Holt & Christenson, PLLC.

(57) ABSTRACT

A fluid delivery system comprises a motor that is configured to provide rotational motion to a rotary component. The fluid delivery system also comprises an alignment mechanism. The alignment mechanism comprises a first roller that engages a pin at a first end, and a second roller that engages the pin at a second end. The alignment mechanism also includes a coupler that is configured to couple the rotary component to a reciprocating component. Additionally, the alignment mechanism comprises a first alignment cavity that is configured to receive the first roller and a second alignment, and a second cavity that is configured to receive the second roller to align reciprocating motion of the reciprocating component.

20 Claims, 10 Drawing Sheets

(56) References Cited

U.S. PATENT DOCUMENTS

| | | | | | |
|---|---|---|---|---|---|
| 2,654,326 | A * | 10/1953 | Welker | F04B 1/06 | 417/419 |
| 2,681,623 | A * | 6/1954 | Kane | E21B 43/12 | 417/399 |
| 3,274,879 | A * | 9/1966 | Poller | F16B 21/086 | 37/456 |
| 3,839,946 | A * | 10/1974 | Paget | F04B 39/066 | 92/153 |
| 3,927,605 | A * | 12/1975 | Siczek | B05B 9/0413 | 92/13.1 |
| RE31,113 | E * | 12/1982 | Coker | A63B 21/0615 | 482/98 |
| 4,512,149 | A * | 4/1985 | Weaver | F04B 47/02 | 60/371 |
| 4,848,085 | A * | 7/1989 | Rosman | E21B 43/127 | 60/372 |
| 5,092,749 | A * | 3/1992 | Meijer | F04B 9/045 | 417/474 |
| 5,484,268 | A * | 1/1996 | Swank | F04B 1/1075 | 417/211 |
| 5,616,010 | A * | 4/1997 | Sawyer | F02B 63/06 | 123/DIG. 8 |
| 5,762,480 | A * | 6/1998 | Adahan | F01B 9/02 | 417/359 |
| 5,769,321 | A * | 6/1998 | Cyphers | F04B 9/045 | 239/154 |
| 5,934,173 | A | 8/1999 | Murphy et al. | | |
| 5,975,430 | A | 11/1999 | Larsen | | |
| 6,533,488 | B2 | 3/2003 | Blenkush et al. | | |
| 6,820,648 | B2 | 11/2004 | Castagnetta, Jr. | | |
| 6,866,486 | B2 | 3/2005 | Dexter et al. | | |
| 7,125,228 | B2 * | 10/2006 | Dexter | B08B 3/026 | 417/299 |
| RE42,706 | E * | 9/2011 | Davidson | F04B 9/02 | 417/415 |
| 8,177,524 | B1 | 5/2012 | Kieffer et al. | | |
| 8,182,247 | B2 * | 5/2012 | Gallwey | F04B 39/0027 | 417/411 |
| 8,316,685 | B2 * | 11/2012 | Stucki | B25B 27/10 | 81/345 |
| 8,875,969 | B2 | 11/2014 | Pedicini | | |
| 9,016,599 | B2 | 4/2015 | Johnson et al. | | |
| 2002/0168275 | A1 | 11/2002 | Cooper | | |
| 2007/0199391 | A1 * | 8/2007 | Fourqurean | F04B 1/02 | 74/25 |
| 2009/0297374 | A1 | 12/2009 | Gallwey | | |
| 2010/0001100 | A1 | 1/2010 | Fontaine | | |
| 2010/0224699 | A1 | 9/2010 | Gaddis | | |
| 2013/0209297 | A1 * | 8/2013 | Goertzen | F04B 53/006 | 417/443 |
| 2013/0277455 | A1 | 10/2013 | Thompson et al. | | |
| 2014/0219819 | A1 * | 8/2014 | Roman | F04B 17/03 | 417/12 |
| 2014/0261755 | A1 | 9/2014 | Fontaine | | |
| 2016/0186743 | A1 | 6/2016 | Thompson et al. | | |
| 2017/0292506 | A1 * | 10/2017 | Shultz | B05B 9/0413 | |

FOREIGN PATENT DOCUMENTS

| | | | | |
|---|---|---|---|---|
| DE | 102008050662 | A1 | 3/2010 | |
| EP | 0697066 | B1 | 12/1996 | |
| GB | 2076495 | A * | 12/1981 | F16C 11/045 |
| RU | 2485348 | C2 | 6/2013 | |
| WO | WO 2016109673 | A1 | 7/2016 | |

OTHER PUBLICATIONS

Steel Supply (https://www.thesteelsupplyco.com/clevis-pins, note document "Clevises Pins" dated 2015) (Year: 2015).*

International Preliminary Report on Patentability for International Patent Application No. PCT/US2017/036781, date of mailing: Feb. 7, 2019, date of filing: Jun. 9, 2017, 7 pages.

Search Report and Written Opinion dated Sep. 4, 2017 from PCT/US2017/036781.

Siswanto et al., "Computational Kinematics Sensitivity Analysis of Eccentric Reciprocating Slider Mechanism", International Journal of Mathematical Models and Methods in Applied Sciences, Issue 3, vol. 6, 2012, pp. 452-459.

Supplementary Search Report for European Patent Application No. 17834914.8 dated Oct. 28, 2019, 12 pages.

First Office Action for Chinese Patent No. 201780045464.6 dated Jul. 12, 2019, 20 pages.

Second Office Action for Chinese Patent Application No. 201780045464.6 dated Feb. 24, 2020, 20 pages with English Translation.

Extended Search Report for European Patent Application No. 17834914.8 dated Feb. 4, 2020, 10 pages.

Third Office Action for Chinese Patent Application No. 201780045464.6 dated Sep. 3, 2020, 20 pages with English Translation.

* cited by examiner

ALIGNING RECIPROCATING MOTION IN FLUID DELIVERY SYSTEMS

BACKGROUND

The present disclosure generally relates to fluid delivery systems. More specifically, but not by limitation, the present disclosure relates to mechanisms used to align reciprocating motion of a fluid pump.

There are a wide variety of fluid pumps. Pumps can use mechanical, pneumatic, hydraulic, or electrical mechanisms to transfer a fluid material to a surface. They can be used in numerous operations such as industrial and residential spray painting, pressure washing, and insulation application, among others. The type of operation as well as the conditions in which the operation will be performed may influence a determination as to which type of pump should be used. However, some pump features are desired across a wide variety of pumps. For instance, it is desirable to use a pump with the capability of maintaining adequate fluid pressure during operation.

SUMMARY

A fluid delivery system comprises a motor that is configured to provide rotational motion to a rotary component. The fluid delivery system also comprises an alignment mechanism. The alignment mechanism comprises a first roller that engages a pin at a first end, and a second roller that engages the pin at a second end. The alignment mechanism also includes a coupler that is configured to couple the rotary component to a reciprocating component. Additionally, the alignment mechanism comprises a first alignment cavity that is configured to receive the first roller and a second alignment, and a second cavity that is configured to receive the second roller to align reciprocating motion of the reciprocating component.

DETAILED DESCRIPTION OF ILLUSTRATIVE EMBODIMENTS

Figure 1A:
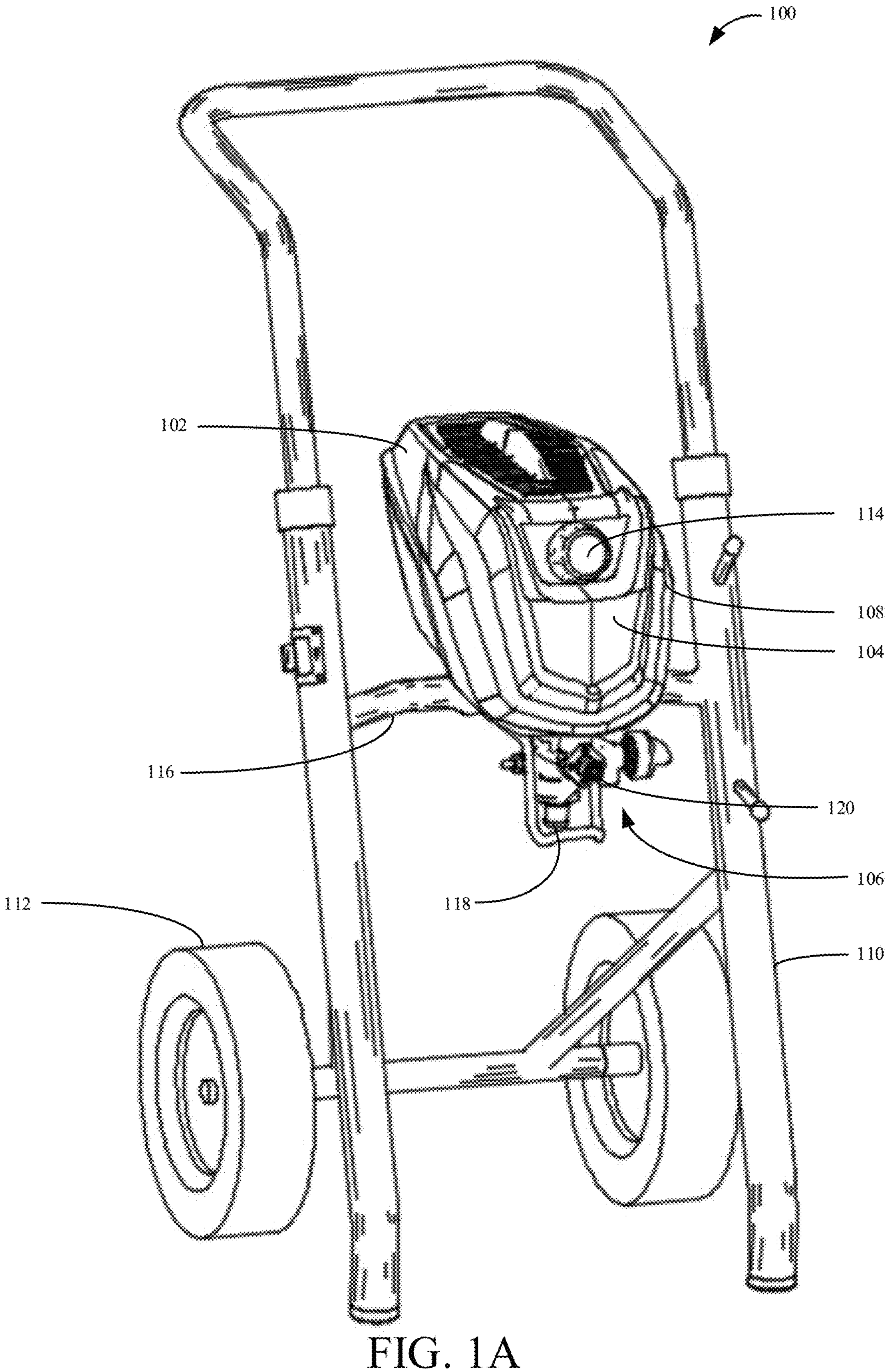
FIG. 1A is a perspective view illustrating a fluid delivery system, in accordance with one embodiment.

Many engines and pumps use reciprocating motion. For example, internal combustion engines use reciprocating motion of a piston to rotate a crankshaft. Pumps such as fluid pumps use reciprocating motion to drive a piston of a hydraulic cylinder. In some embodiments, a motor generates rotational motion, which is converted to reciprocating motion. Conventional mechanisms for converting rotational motion to translational motion (or vice-versa-converting translational motion to rotational motion) may have deficiencies that decrease mechanical efficiency.

It is often useful to generate efficient motion. However, it may be challenging to achieve efficiency when generating reciprocating motion, which consists of repetitive movement across a linear plane (i.e. a moving back and forth in a substantially straight line). More specifically, it may be challenging to generate substantially linear reciprocating motion, especially in systems that convert rotary motion to reciprocating motion.

Aspects of the present disclosure relate to fluid delivery systems. More particular aspects relate to aligning mechanisms for a fluid pump. While embodiments discussed herein will be broadly described in the context of fluid sprayers, it is expressly contemplated that embodiments are practical for any use of reciprocating motion.

In one embodiment, a mechanism for converting rotational motion to translational motion comprises a slider-crank. A slider-crank mechanism comprises one or more joints (e.g. pivot points) or linkages that allow a rotary component to drive linear motion of a slider. Linear motion of a slider may be applied to, for example, a reciprocating component such as a piston of a hydraulic cylinder.

In one embodiment of a fluid delivery system, a hydraulic cylinder comprises a mechanical actuator that uses reciprocating piston strokes to distribute a force on a liquid. A piston rod, for example, receives the reciprocating motion from a slider-crank mechanism. The piston rod may be inserted into and retracted out of a cylinder during respective upstroke and downstroke movement of the piston. The cylinder may be closed at a first end by a cylinder head, and closed at second end by a cylinder base.

Where a piston rod is received in a cylinder, the conversion of motion by, for example, a slider-crank mechanism, may produce motion with undesirable variances. For instance, in conventional fluid delivery systems, reciprocating motion may undesirably deviate from a linear plane respective a receiving portion for the piston. Typical arrangements include mechanisms positioned at the end of a piston to accept rotational motion and transfer that motion to movement of the piston. However, such an arrangement generates horizontal force that produces cantilevered side loading on a piston seal, thereby causing undesirable wear to said components. This can decrease the longevity of a pump. In another typical arrangement, an intermediary component is positioned to attempt to ensure the piston remains in-line. However, such an arrangement is complicated to manufacture, and therefore expensive to produce.

As such, there may be a need for a fluid delivery system that generates efficient reciprocating motion by using an alignment mechanism that aligns a reciprocating component. More particularly, but not by limitation, there is a need for a low cost mechanism that reduces side loading of a piston during the translation of rotational motion to reciprocating motion.

FIG. 1A is a perspective view illustrating a fluid delivery system 100, in accordance with one embodiment. Fluid delivery system 100 illustratively comprises a portable paint sprayer that is configured to spray atomized paint onto a variety of surfaces. Fluid delivery system 100, in one embodiment, is mounted to cart 110. Cart 110 comprises wheels 112 that are attached to a cart and configured to allow system 100 to be a mobile system. For example, an operator can transport fluid delivery system 100 to a desired location for painting. In another embodiment, cart 110 comprises skids that stably support the system on a surface.

In the illustrated example, fluid delivery system 100 comprises motor assembly 102 (hidden underneath housing 108 in FIG. 1A), alignment mechanism 104 (hidden underneath housing 108 in FIG. 1A), pump assembly 106 (hidden underneath housing 108 in FIG. 1A), housing 108, and pump actuator 114.

In one embodiment, pump assembly 106 is configured to generate a pressurized flow of fluid that is provided to an outlet port 120. The outlet port is coupled to a tube, hose, or other component that provides a flow path to an applicator, such as a spray gun. Pump assembly 106 comprises a fluid inlet path 118 that is configured to receive the fluid from a fluid source (not shown). For instance, fluid inlet path 114 is coupled to a hose that is placed in a paint container or other reservoir that stores paint to be used for application. The fluid is transported through an inlet path due to suction created by pump assembly 106. In one embodiment, a fluid return path provides a return flow of fluid to the paint container. For instance, the return path (not shown) returns paint to the container during priming of pump 106.

Pump assembly 106 can be one of a variety of different types of pumping mechanisms. In one embodiment, pump assembly 106 comprises a hydraulic displacement pump. In the illustrated example, pump assembly 106 comprises a reciprocating piston pump, in which a hydraulic cylinder receives a piston. A hydraulic cylinder comprises a mechanical actuator that distributes a force on a liquid using reciprocating piston strokes. As such, pump 106 can perform mechanical work to move a fluid.

Fluid delivery system 100 comprises housing 108. Housing 108 is configured to house motor assembly 102, alignment mechanism 104, and pump assembly 106. Housing 108 is illustratively secured to cart 110 by mounting mechanism 116. In one embodiment, pump housing 108 is removable to access various components.

Figure 1B:
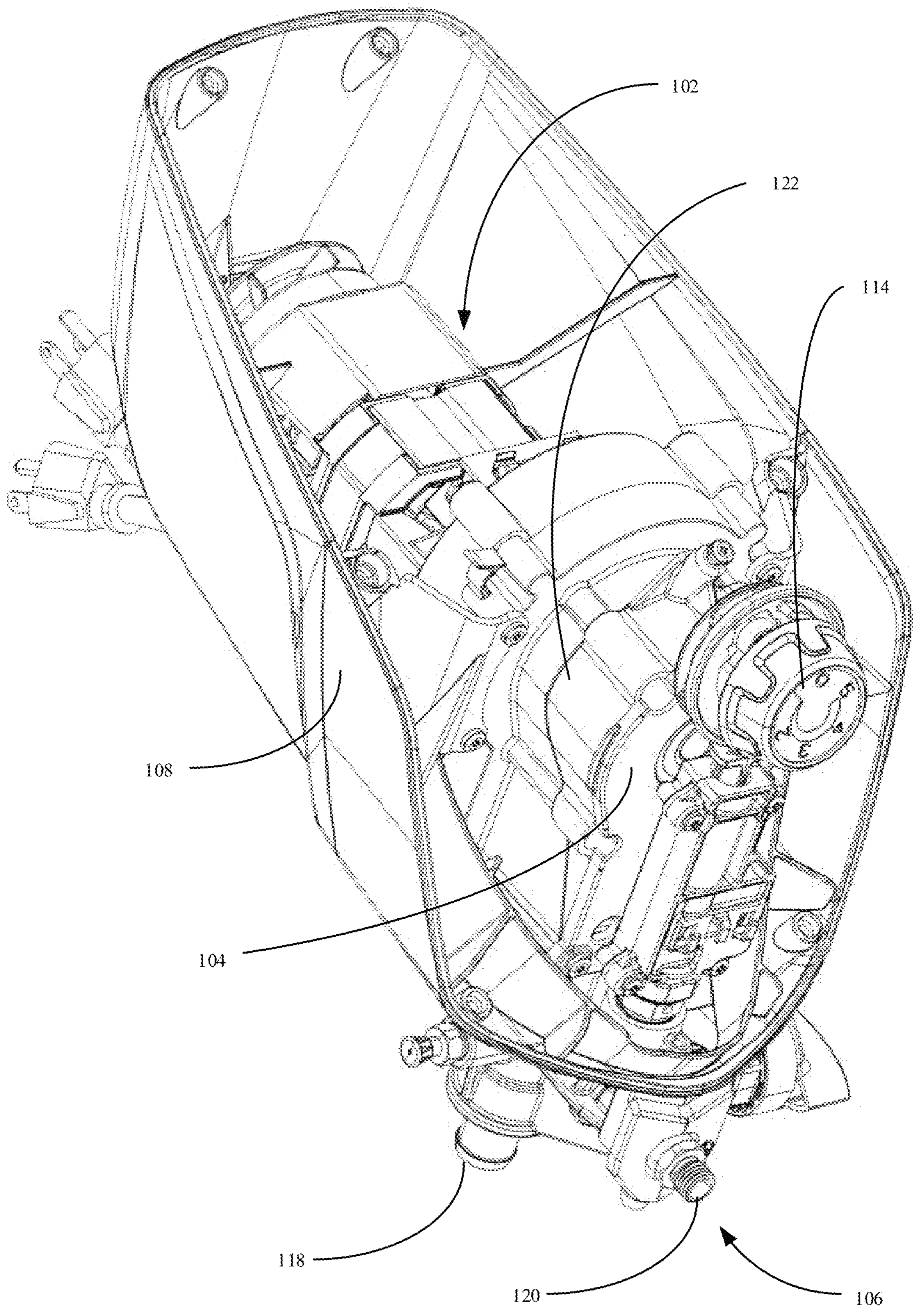
FIG. 1B is a perspective view illustrating a fluid delivery system with a top portion of a housing removed, in accordance with one embodiment.

FIG. 1B is a perspective view illustrating fluid delivery system 100 with components (such as housing 108) removed for illustrative purposes.

Pump assembly 106 is driven by a motor assembly 102. Fluid delivery system 100 further illustratively comprises pump actuator 114, which is coupled to motor assembly 102 and pump assembly 106. Pump actuator 114, in one embodiment, comprises a motor control unit that is configured to control fluid delivery operations. An operator of fluid delivery system 100 can thus engage pump actuator 114 to control fluid pressure, motor speed, or other system variables.

In one embodiment, motor assembly 102 generates rotational motion and imparts said motion to alignment mechanism 104. For example, motor assembly 102 imparts rotary motion to a drive shaft that is coupled to alignment mechanism 104. It is illustratively shown that alignment mechanism 104 is housed in alignment housing 122.

Alignment mechanism 104 transfers the motion imparted by motor system 102 to pumping mechanism 106. In one embodiment, alignment mechanism 104 converts rotary motion from motor assembly 102 to reciprocating motion, and applies the converted motion to pumping mechanism 106. In addition to converting rotary motion to reciprocating motion, alignment mechanism 104 may also be configured to substantially align components of pumping mechanism 106 to increase efficiency.

Figure 2:
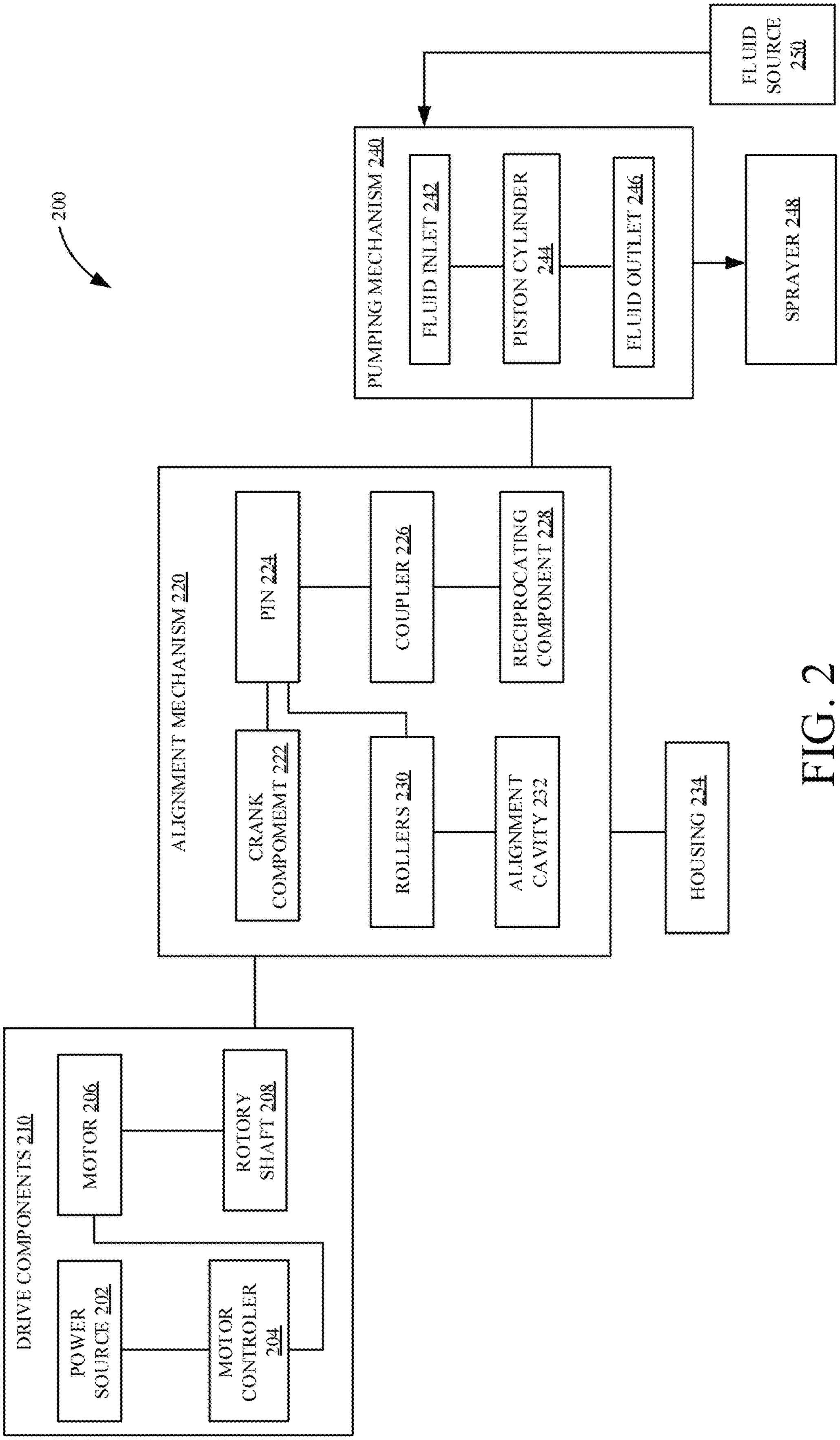
FIG. 2 is a block diagram of a fluid delivery system that includes an alignment mechanism, in accordance with one embodiment.

FIG. 2 is a block diagram of a fluid delivery system 200 that includes an alignment mechanism, in accordance with one embodiment. Fluid delivery system 200 illustratively comprises drive components 210, alignment mechanism 220, and pumping mechanism 240. Fluid delivery system 200 may be similar to the fluid delivery system described with respect to FIG. 1A and FIG. 1B (e.g. system 100).

Fluid delivery system 200 may be a wide variety of fluid delivery pump configurations such as, but not limited to, hydraulic, pneumatic, mechanical, etc. In one embodiment, fluid delivery system 200 comprises a positive-displacement piston pump. A variety of fluid delivery systems mechanisms may also be used, such as, but not limited to, airless, air-assisted, air-assisted airless, etc.

Drive components 210 illustratively comprise power source 202, motor controller 204, motor 206, and rotary shaft 208. In one embodiment, motor 206 receives power from power source 202. Motor 206 may be a variety of motors such as, but not limited to, an electric motor. For example, motor 206 comprises a brushless DC electric motor. In an embodiment where motor 206 is an electric motor, for example, power source 202 comprises a battery that stores energy.

Motor controller 204 is configured to manually, automatically, and/or remotely control operation of motor 206. For instance, motor controller 204 regulates the amount of power that is provided from power source 202 to motor 206. In one embodiment, motor controller 204 comprises a motor control switch that that can be actuated by an operator (e.g. similar to pump actuator 114) to control fluid delivery. As such, fluid delivery system 100 is configured to allow an operator to control output of pumping mechanism 212 by, for instance, using a motor control switch.

Motor 206, in one embodiment, generates rotational motion. It is illustratively shown that motor 206 is operably coupled to rotary shaft 208. Rotary shaft 208 comprises, in one embodiment, a drive shaft. For instance, rotary shaft 208 comprises one or more gears such as a gear chain. Motor 206 is therefore configured to impart rotational motion to rotary shaft 208. The rotation of rotary shaft 208, and thus the direction of motion produced by motor 206, may be unidirectional (e.g. the drive shaft receives either clock-wise or counter clock-wise rotational motion). Alternatively, the rotation of rotary shaft 208, and thus the direction of motion produced by motor 206, may be bi-directional (e.g. the drive shaft receives alternating rotational motion-alternating between clock-wise and counter clock-wise directions).

As similarly discussed above with respect to FIG. 1A and FIG. 1B (e.g. fluid delivery system 100), pumping mechanism 212 uses one or more components to convert the either uni-directional or bi-directional motion to reciprocating motion. In one embodiment, fluid delivery system 200 converts rotational motion of rotary shaft 208 to reciprocating motion of pumping mechanism 212 (e.g. reciprocating piston strokes within a hydraulic cylinder to distribute a force on a liquid) by using alignment mechanism 220.

Alignment mechanism 220 illustratively comprises rotary component 222, pin 224, coupler 226, reciprocating component 228, rollers 230, and alignment cavity 232. Rotary component 222 is illustratively coupled to rotary shaft 208 at a first end and configured to receive rotational motion from rotary shaft 208 to rotate about an axis (e.g. an axis parallel to rotary shaft 208). In one embodiment, rotary component 222 comprises a crank component of a slider-crank mechanism. However, it is noted that that rotary component 222 may be a variety of other components configured to receive rotational motion.

At a second end, rotary component 222 illustratively engages pin 224. In one embodiment, rotary component 222 comprises a receiving portion that is configured to pivotally engage pin 224. For instance, pin 224 is inserted into the receiving portion of the rotary component to provide a surface that rotary component 224 rotates about. As rotary component 222 rotates about an axis, pin 224 moves in a substantially linear direction that is perpendicular to an axis of rotary shaft 208. As such, a pivotable engagement between rotary component 222 and pin 224 facilitates the conversion of rotary motion to reciprocating motion.

In the illustrated embodiment, pin 224 also engages coupler 226. Coupler 226 comprises a receiving portion configured to receive pin 224 such that pin 224 extends through coupler 226. In one embodiment, coupler 226 is positioned near a bottom surface of rotary component 222 and receives pin 224 such that pin 224 is inserted through the receiving portions of both coupler 226 and rotary component 222. Thus, pin 224 forms an engagement between rotary component 222 and coupler 226.

Coupler 226 is illustratively coupled to reciprocating component 228 (e.g. by engaging a head of a reciprocating piston). As such, in one embodiment, coupler 226 couples rotary component 222 to reciprocating component 228. Although a pivotable connection allows for a reciprocating component to perform repeated up-stroke and down-stroke motion, there may be deficiencies in maintaining the reciprocating component in a substantially linear plane.

For instance, there may be a desire for a mechanism that guides the conversion of motion such that the reciprocation of component 228 does not deviate from the center of a linear plane (e.g. a vertical plane perpendicular to an axis of a rotary shaft). Conventional mechanisms may attempt to reduce deviations with software or hardware components that are expensive to manufacture. A mechanism is disclosed herein that reduces the deviation of a piston from the center of a linear plane during conversion of rotary motion to reciprocating motion at reduced manufacturing and development costs.

FIG. 2 illustratively shows that, in one embodiment, rollers 230 are coupled to pin 224. In one example, pin 224 comprises a cylindrical rod. The cylindrical rod extends, for example, past the receiving portion of rotary component 222 to provide a protruding surface for engaging other components of fluid delivery system 200. For example, a protruding surface at each end of pin 224 engages rollers 230. In one embodiment, each end of pin 224 engages a single roller 230. However, it is noted that fewer or additional rollers may be used.

It has illustratively been shown that pin 224 is multi-purpose. In addition to providing a pivotable surface that couples rotary component 222 to reciprocating component 228 via coupler 226, pin 224 is configured to facilitate the alignment of reciprocating component 228, in part, by engaging rollers 230.

Rollers 230 comprise, in one embodiment, one or more wheels configured to slidably engage alignment cavity 232. Rollers 230 may also or alternatively be a variety of other shapes that are received at alignment cavity 232. For example, rollers 230 comprise a rectangular shaped member that is received within alignment cavity 232 (e.g. alignment cavity 232 is a rectangular shaped cavity with a surface area greater than that of the roller). In one embodiment, rollers 230 comprise a substantially plastic material. Rollers 230 may comprise a variety of other materials as well, such as metal, fiber-reinforced plastic, etc.

Alignment cavity 232 comprises, in one embodiment, a recessed portion of housing 234. Housing 234 comprises an enclosure that surrounds alignment mechanism 220 in fluid delivery system 200. In one embodiment, housing 234 is separate from a housing that encloses the fluid delivery system (e.g. housing 234 is separate from pump housing 108). In another embodiment, housing 234 comprises a housing of the fluid delivery system (e.g. housing 234 is a component of pump housing 108). As such, alignment cavity 232 can include any portion of a housing, or surrounding structure, that is configured to receive rollers 230. In an alternative embodiment, alignment cavity 232 comprises a structure that is separate from a housing or enclosure.

In one embodiment, alignment cavity 232 is manufactured with reduced cost by removing portions of an existing housing structure to accommodate alignment components (e.g. alignment cavity 232). This allows for previously manufactured pumping systems to be retro-fitted or re-purposed with an alignment mechanism by generating an alignment cavity that receives sliding alignment members (e.g. rollers 230). For example, in an embodiment where housing 234 comprises a plastic material, alignment cavity 232 may be added to the housing by tooling the cavity into the housing. The cavity may be positioned at the desired location that allow rollers 230 to engage a protruding surface of pin 224.

As will be discussed in further detail below, rollers 230 and alignment cavity 232 may be configured to guide reciprocating component 228 as it receives motion from rotary component 222. In one embodiment, rollers 230 slide up and down within cavity 232 as rotary component 222 is rotated by drive components 210. As such, reciprocating motion of reciprocating component 228 is substantially fixed, relative to the area of cavity 232 engaged by rollers 230.

Reciprocating component 228 may be a variety of components compatible with pumping mechanism 240. In one embodiment, reciprocating component 224 comprises a piston that is received in piston cylinder 244. Piston cylinder 244 comprises, for example, a hydraulic cylinder. As such, FIG. 2 illustratively shows that reciprocating member 224 is coupled to pumping mechanism 212.

Reciprocating motion of reciprocating member 224 draws fluid into, and pumps fluid out of pumping mechanism 212. In order to supply a fluid to the fluid pump, pumping mechanism 212 is illustratively coupled to fluid source 214 via fluid inlet 216. Fluid inlet 216 therefore provides a fluid connection between pumping mechanism 212 and fluid source 214. In one embodiment, fluid inlet 216 comprises a suction component that is disposed within fluid source 250, and generates a suction to draw fluid into pumping mechanism 212. As such, on an upstroke of reciprocating member 224, fluid from fluid source 214 may be drawn into pumping mechanism 212 via fluid inlet 216. Pumping mechanism 212 also comprises fluid outlet 218. In one embodiment, fluid outlet 218 is a valve on a painting system that is configured to receive an outlet hose (e.g. a spray gun attachment). On a downstroke of reciprocating member 224, fluid is pumped out of pumping mechanism 212.

Thus, as rotary shaft 208 is rotated, motion converting component 210 converts the rotation to reciprocating motion of reciprocating member 224, which performs sequential upstroke and downstroke movement to deliver a fluid in pumping mechanism 212. Motor 206 can generate hundreds or thousands of upstroke and downstroke reciprocations per second or minute to pump a fluid at a high pressure out of for example, a fluid spray tip.

It is generally desirable to utilize a fluid delivery system with a durable and reliable pumping mechanism. However, while a high rate of reciprocation produces high pressure (which is beneficial for spraying applications), in conventional systems it may cause undesirable damage to a piston cylinder, piston, support bearings, and other pump components. As an example, a reciprocating member (e.g. a pump shaft, piston, etc.) may be slightly misaligned with a receiving piston cylinder during pumping operation. The piston may be forced against walls of the cylinder due to slight variances in the angle between a crank member and reciprocating member. Variances in fluid pressure may also cause the downstroke depth and upstroke return height of reciprocating member to vary as well.

Even a slight misalignment that causes the reciprocating member to deviate from a linear plane upon generation of upstroke and downstroke motion may damage components and reduce the longevity of the pump. For instance, a seal between a cylinder and a piston may become deformed or loosened. This may also cause unpredictable changes in fluid pressure. It is desirable to maintain consistent fluid pressure within a fluid delivery system as variances in pressure may cause uneven spray patterns, tailing, and edge smearing. Even when a high pressure output is not required, it should be noted that it remains largely beneficial to utilize a mechanism that facilitates consistent motion conversion and the alignment of a reciprocating component.

Figure 3:
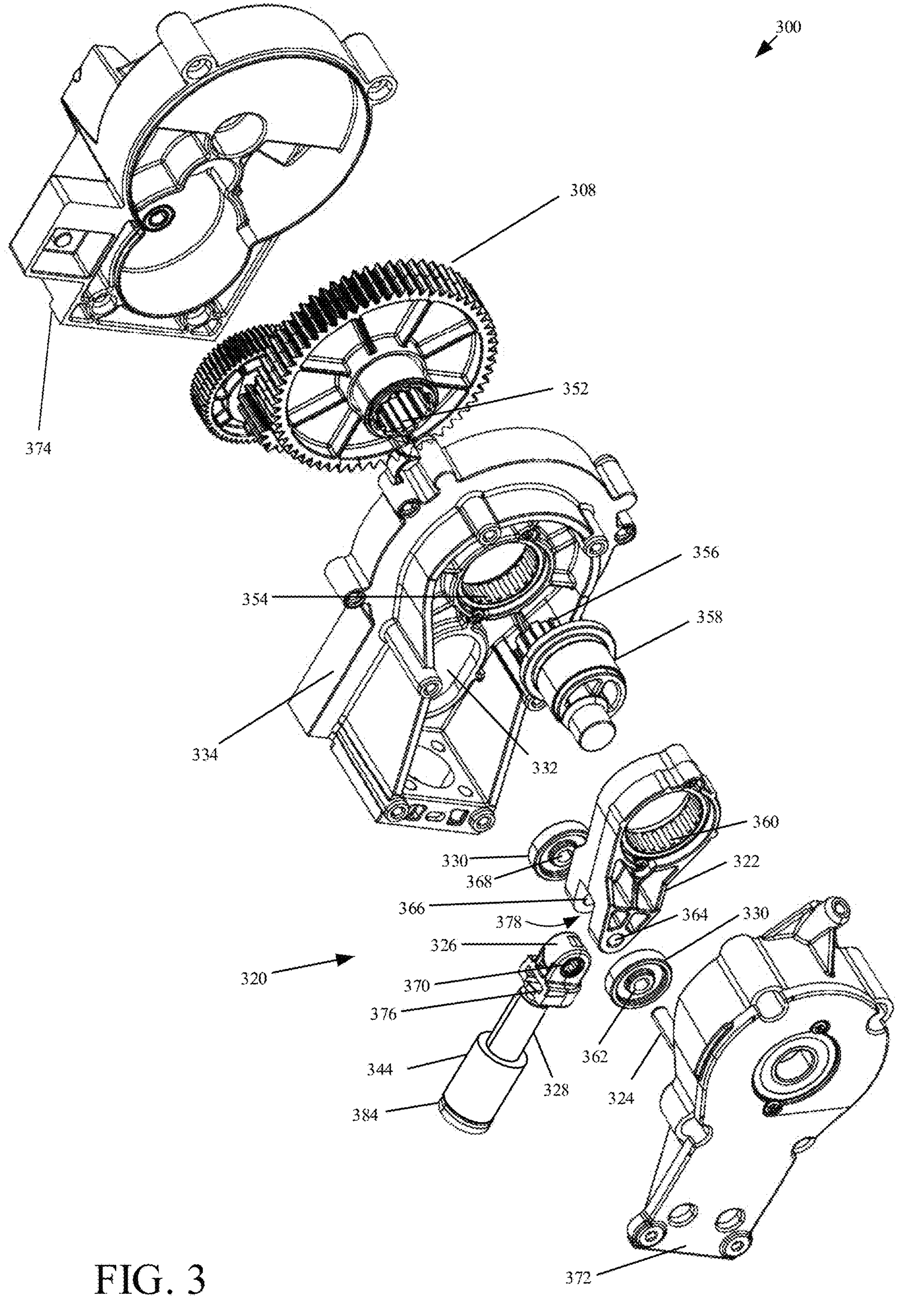
FIG. 3 is an exploded view illustrating an alignment mechanism in a fluid delivery system, in accordance with one embodiment.

FIG. 3 is an exploded view illustrating alignment mechanism 320 in fluid delivery system 300, in accordance with one embodiment. In one embodiment, fluid delivery system 300 and alignment mechanism 320 include similar features to those discussed with respect to FIG. 2 (e.g. fluid delivery system 200 and alignment mechanism 220).

Fluid delivery system 300 illustratively comprises rotary component 308. Rotary component 308 receives rotational motion from a motor assembly (e.g. motor 206) and comprises a gear assembly that imparts rotational motion to alignment mechanism 320. It is illustratively shown that a gear of rotary component 308 comprises an axis portion 352 that is configured to engage a protruding portion 356 of eccentric 358. Eccentric 358 can therefore be fixed to rotary component 308 in a position that is offset (e.g. offset from the center) from a center axis, and thus offset from a center line of rotary component 308, for example. Axis portion 352 and eccentric 358 are illustratively received by a bearing assembly 354 disposed at alignment housing 334 (e.g. housing 234). Bearing assembly 354, in one embodiment, facilitates the transfer of rotational motion from axis portion 352 to eccentric 358.

Rotational motion that is applied to eccentric 358 is further transferred to alignment mechanism 320. Alignment mechanism 320 illustratively comprises rotary component 322. Rotary component 322 comprises, in one embodiment, strap 360, which is configured to receive eccentric 358. For example, strap 360 comprises a collar with a bearing assembly disposed at an interior portion of the collar. The bearing assembly is configured to receive eccentric 358 and allow eccentric 358 to rotate, thereby imparting rotational motion to rotary component 322. It is noted that a variety of motion imparting mechanisms can be used in addition or alternatively to those described herein. While an eccentric sheave and strap are primarily discussed, rotational motion can be generated and transferred to rotary component 322 in a variety of different ways.

Thus, in one embodiment, rotary component 322 rotates about an axis to generate a rotational pattern of movement. Rotary component 322 illustratively comprises a base portion 378 that is disposed at an opposite end, for example, of strap 360 at which eccentric 358 is received.

Figure 4:
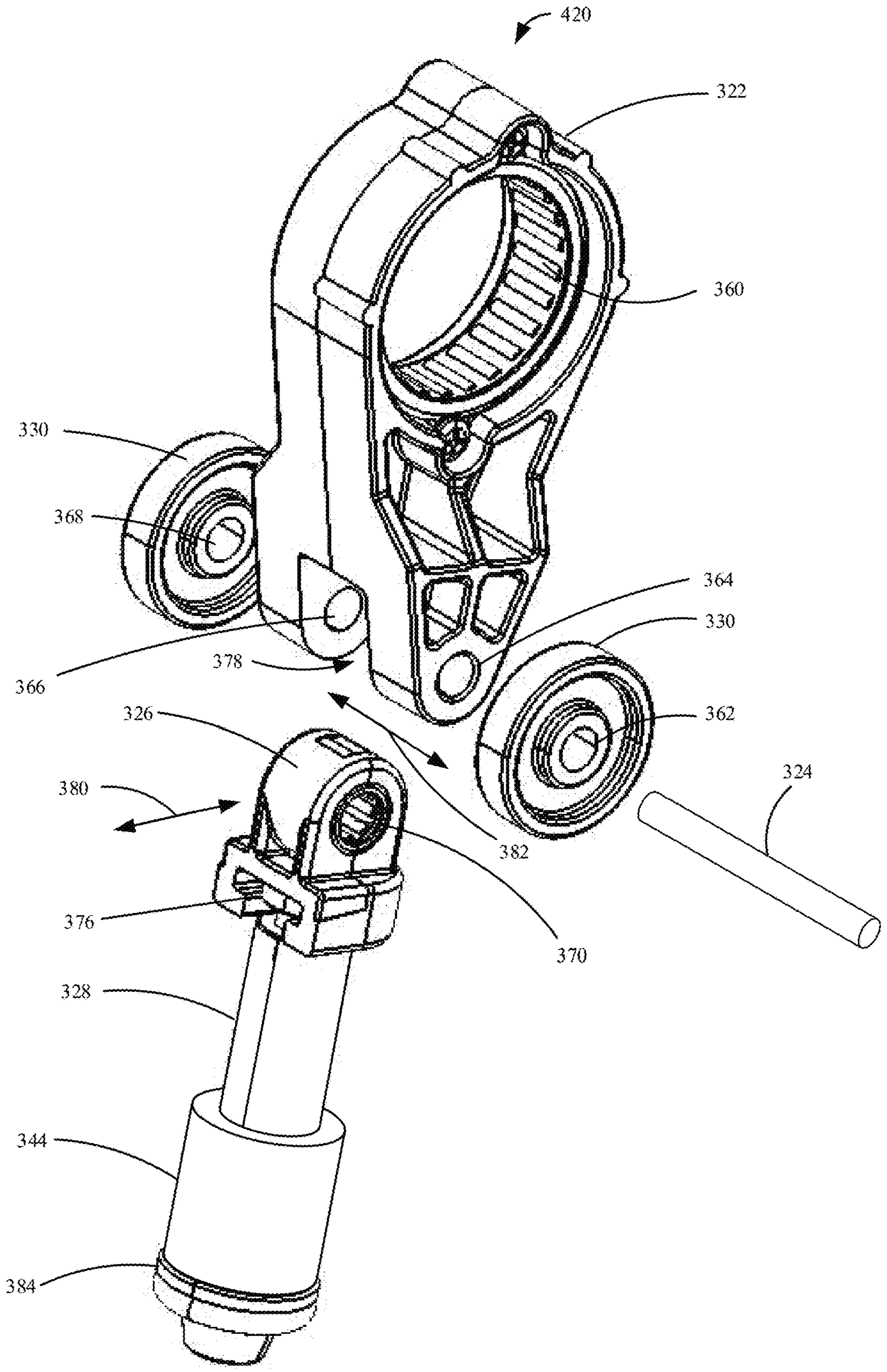
FIG. 4 is an exploded view illustrating an alignment mechanism with a motion converting component, in accordance with one embodiment.

FIG. 4 is an exploded view illustrating an alignment mechanism with a motion converting component, in accordance with one embodiment. In one embodiment, alignment mechanism 420 illustratively comprises the same or similar features discussed with respect to FIG. 3 (e.g. alignment mechanism 320). FIG. 3 and FIG. 4 will now be described in conjunction.

Near base portion 378, rotary component 322 comprises receiving portion 364 and 366. In one embodiment, receiving portion 364 and 366 are configured to receive pin 324 such that pin 324 extends past the body of the rotary component. Receiving portions 364 and 366 include, for example, a diameter that is larger than a diameter of pin 324 such that pin 324 has at least some freedom of movement (e.g. allows for rotation with friction between the body of component 322 and an exterior surface of pin 324) while inserted in component 322.

Rollers 330 each comprise a receiving portion, generally shown at reference numerals 362 and 368. Receiving portions 362 and 368 comprise a diameter that is larger than a diameter of pin 324 such that pin 324 is configured to rotate while inserted in rollers 330. In one embodiment, the diameter of receiving portions 368 and 362 is the same or substantially the same as the diameter of receiving portions 364 and 366.

Additionally, alignment mechanism 320 illustratively comprises reciprocating component 328. Reciprocating component 328 comprises a coupler 326 attached at a first end. Coupler 326 illustratively includes receiving portion 370. Receiving portion 370 is also configured to receive pin 324 such that the pin can rotate within the coupler. In one embodiment, receiving portion 370 comprises a diameter that is larger than a diameter of pin 324 (e.g. receiving portion 370 has the same diameter as receiving portions 362, 364, 366, and 368).

As such, in one embodiment, alignment mechanism 320 uses pin 324 to facilitate a coupling between rotary component 322 and reciprocating component 328. Pin 324 can be inserted into receiving portion 362 of a first roller 330, receiving portion 364 of rotary component, receiving portion 370 of coupler 326, receiving portion 366 of rotary component 322, and receiving portion 368 of a second roller 330.

During pumping operation, for example, the aforementioned coupling converts rotation of rotary component 322 to translational motion of reciprocating component 328. Reciprocating component 328 is translatably disposed within a bushing 344. The busing 344 is retained within a surrounding pump housing by a retaining mechanism. In one embodiment, bushing 344 engages seal 384. For example, seal 384 is an O-ring configured to form a sealing engagement with bushing 344. As such, the reciprocating motion (e.g. repeated up-stroke and down-stroke movement) of reciprocating component 328 is applied to a hydraulic cylinder to pressurize fluid in a fluid path. Bushing 344 is, in one embodiment, a rigid structure that extends vertically with respect to reciprocating component 328 (e.g. a piston).

Therefore, it is desirable to move a piston in and out of a cylinder, for example, without pressing against the walls of the bushing or a supporting structure (e.g. a sealing) such as O-ring 384.

However, deviation from a substantially linear plane (e.g. a plane that a piston is to be received within a cylinder) during the process of converting rotational motion of a rotary component to reciprocating motion of a piston can occur. Therefore, the coupling of rotary component 322 with reciprocating component 328 comprises mechanisms for aligning the conversion of motion such that reciprocation of a piston is substantially vertical with respect to a receiving cylinder.

FIGS. 3 and 4 illustratively show that rollers 330 engage alignment cavity 332. In one embodiment, alignment cavity 332 comprises a recessed portion of alignment housing 334 and is configured to engage rollers 330 such that they slide within the cavity during operation of the pumping mechanism. Rollers 330, in one embodiment, roll within alignment cavity 332 and are configured to reduce friction and improve efficiency. In an embodiment where rollers 330 are configured to roll, alignment mechanism 320 reduces heat generation, which can otherwise be detrimental to system operation. Alignment housing portion 372 may also include alignment cavity 332 (not shown in current view of FIG. 3) that is configured to receive roller 330. Briefly, it is also illustratively shown that fluid delivery system 300 may use an exterior housing portion 374 to enclose and secure the various components of the system (e.g. alignment mechanism 320 components, rotary gear components 308, etc.). Therefore, as rotary component 322 rotates, rollers 330 confine the translational motion of reciprocating component 328 to a fixed range of motion. For example, the fixed range of motion is defined by an area of cavity 332 that the rollers slide along. Further, rollers 330 may be configured to oppose a side force from rotary component 322. Opposing a side force may include, for example, removing a cantilevered load that is applied to reciprocating component 328. As such, rollers 330 are configured to, in one embodiment, transmit substantially in-line forces only (e.g. in-line with a vertical plane of reciprocating component 328).

In addition, FIGS. 3 and 4 illustratively show that alignment mechanism 320 comprises mechanisms that self-align reciprocating component 328. For example, it is illustratively shown that coupler 326 comprises slot 376. In one embodiment, slot 376 comprises a T-slot that is configured to allow reciprocating component 328 to move within the slot. T-slot 376 may therefore comprise a self-centering mechanism that aligns reciprocating component 328 in the direction generally indicated by arrow 380 shown in FIG. 4 by allowing the reciprocating component to move back and forth within the slot with reduced friction. Further, in one embodiment, alignment mechanism 320 is configured to self-align in the direction generally indicated by arrow 382 shown in FIG. 4. For example, coupler 326 is configured to translate along pin 324 between base portion 378 of rotary component 322 in the directions generally indicated by arrow 382.

Figure 5:
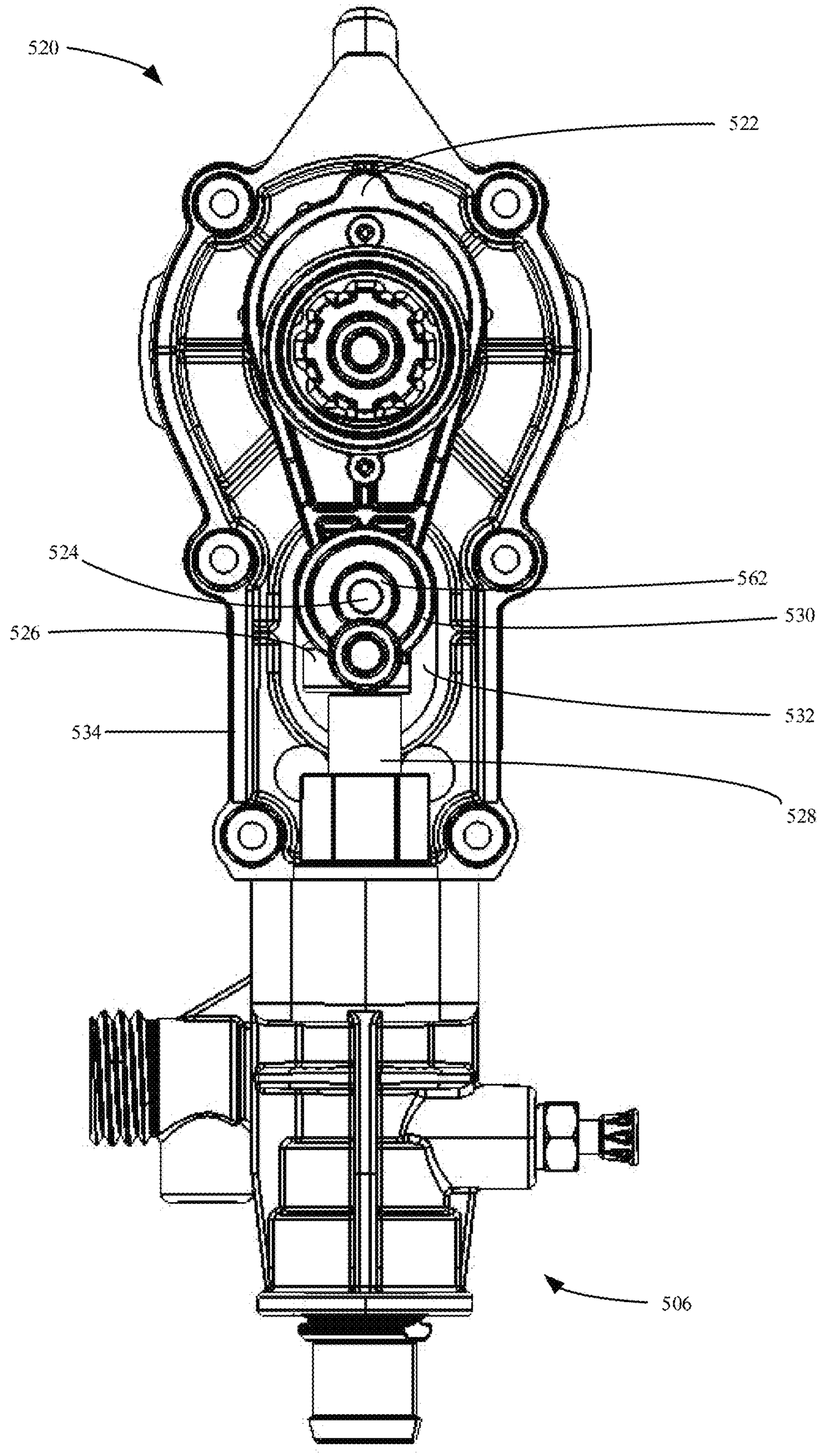
FIG. 5 is a front elevation view illustrating a housing that receives an alignment mechanism, in accordance with one embodiment.

FIG. 5 is a front elevation view illustrating a housing that receives an alignment mechanism, in accordance with one embodiment. In one embodiment, alignment mechanism 520 illustratively comprises the same or similar features discussed with respect to FIG. 3 (e.g. alignment mechanism 320). However, it is noted that alignment mechanism 520 can include different or additional components and is not limited to those discussed herein.

It is shown in FIG. 5 that, in one embodiment, pin 524 is inserted into roller 530, rotary component 522, and coupler 526. As such, in one embodiment, FIG. 5 illustratively shows an assembled alignment mechanism 520 that confines movement of reciprocating component 528 to an area defined by alignment cavity 532, which slidably receives rollers 530.

Figure 6:
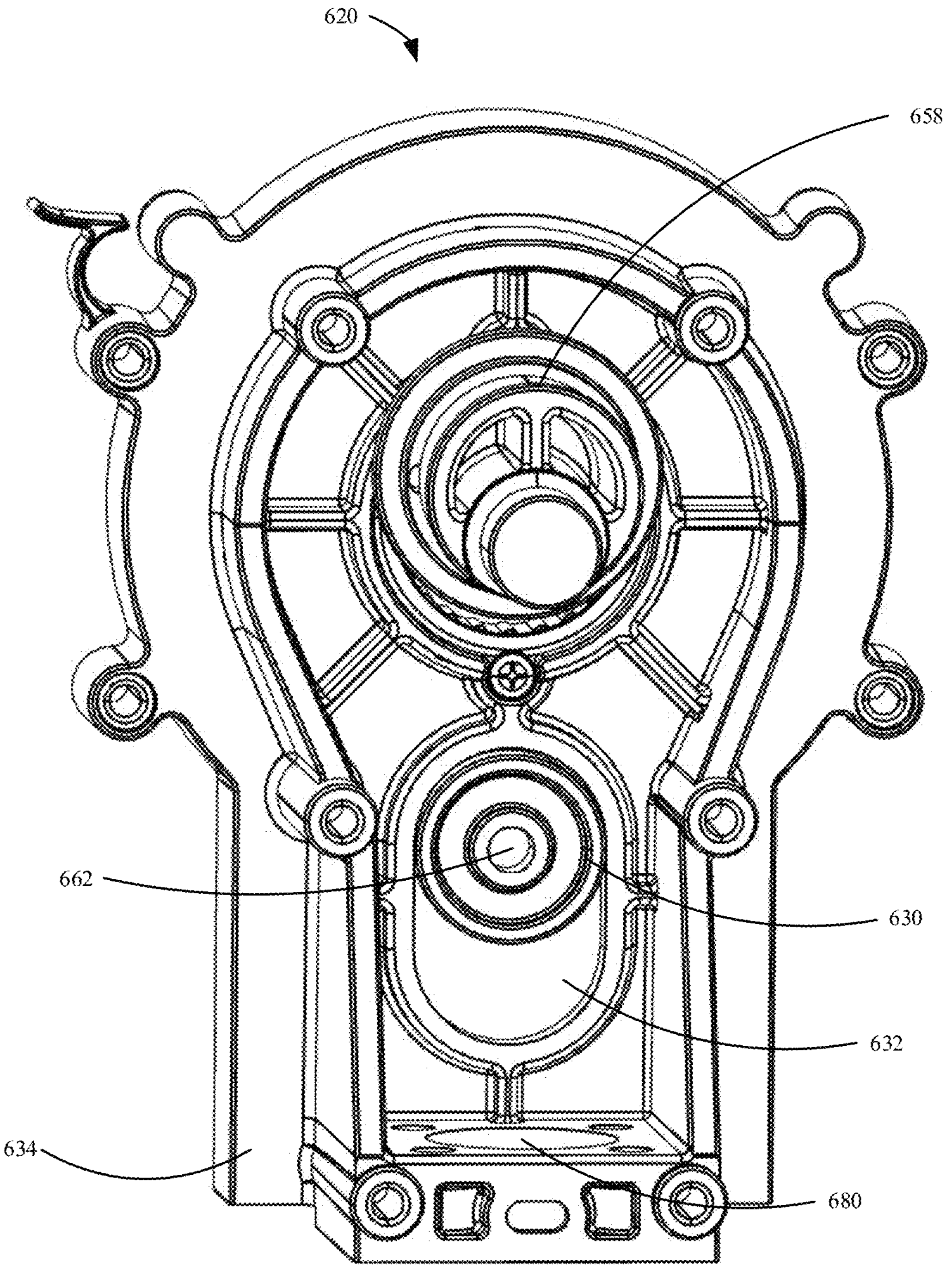
FIG. 6 is a partial front view illustrating an alignment mechanism installed in a motion converting component, in accordance with one embodiment.

FIG. 6 is a partial front view illustrating an alignment mechanism installed in a motion converting component, in accordance with one embodiment. FIG. 6 illustratively includes an alignment mechanism 620 that receives roller 630 within alignment cavity 632 of housing 634. Alignment mechanism 620 comprises, in one embodiment, the same or similar features discussed with respect to FIG. 3 (e.g. alignment mechanism 320). FIG. 6 illustratively shows that various components (e.g. a second housing portion 372, a rotary component 322, and a pin 324, among others) have been removed for illustrative purposes. Thus, it is shown in FIG. 6 that roller 630 is configured to include a surface area that allows the roller to be received within alignment cavity 632. Roller 630 is configured to slide and/or roll within alignment cavity 632 which comprises, in one embodiment, a recessed portion of housing 634. During operation, for example, roller 630 prevents attached components (e.g. components removed from FIG. 6 for purpose of illustration) from deviating past a plane of motion defined by the slidable area of cavity 632 that is engaged by roller 630. Alignment cavity 632 may be a variety of alignment configurations. For example, alignment cavity 632 comprises an opening or removed portion in housing 634 configured to allow roller 630 to protrude past housing 634 and engage an outer surface of the housing.

Figure 7:
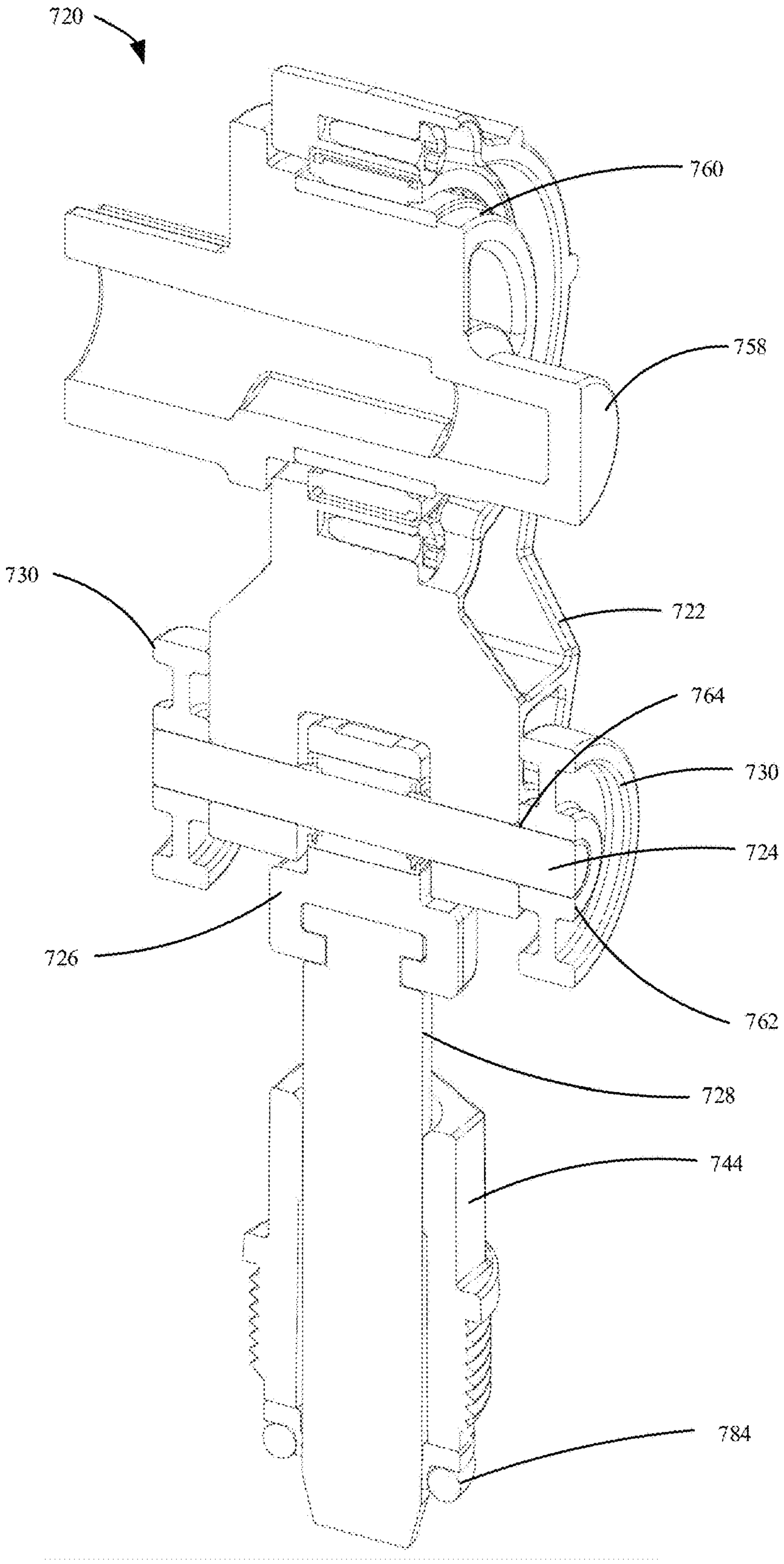
FIG. 7 is a side sectional view of an alignment mechanism, in accordance with one embodiment.

FIG. 7 is a side sectional view of an alignment mechanism 720, in accordance with one embodiment. In one embodiment, alignment mechanism 720 comprises the same or similar features discussed with respect to FIG. 3 (e.g. alignment mechanism 320). It is illustratively shown that some of the components discussed with respect to FIG. 3 are provided in FIG. 7 with corresponding reference numerals. For example, but not by limitation, eccentric 758 may include the same or similar features discussed with respect to eccentric 358, roller 730 may include the same or similar features discussed with respect to roller 330, coupler 726 may include the same or similar features discussed with respect to coupler 326, etc. As such, discussion of FIG. 3 and the interrelation of various components is hereby incorporated with reference to the interrelated features shown in FIG. 7.

Figure 8:
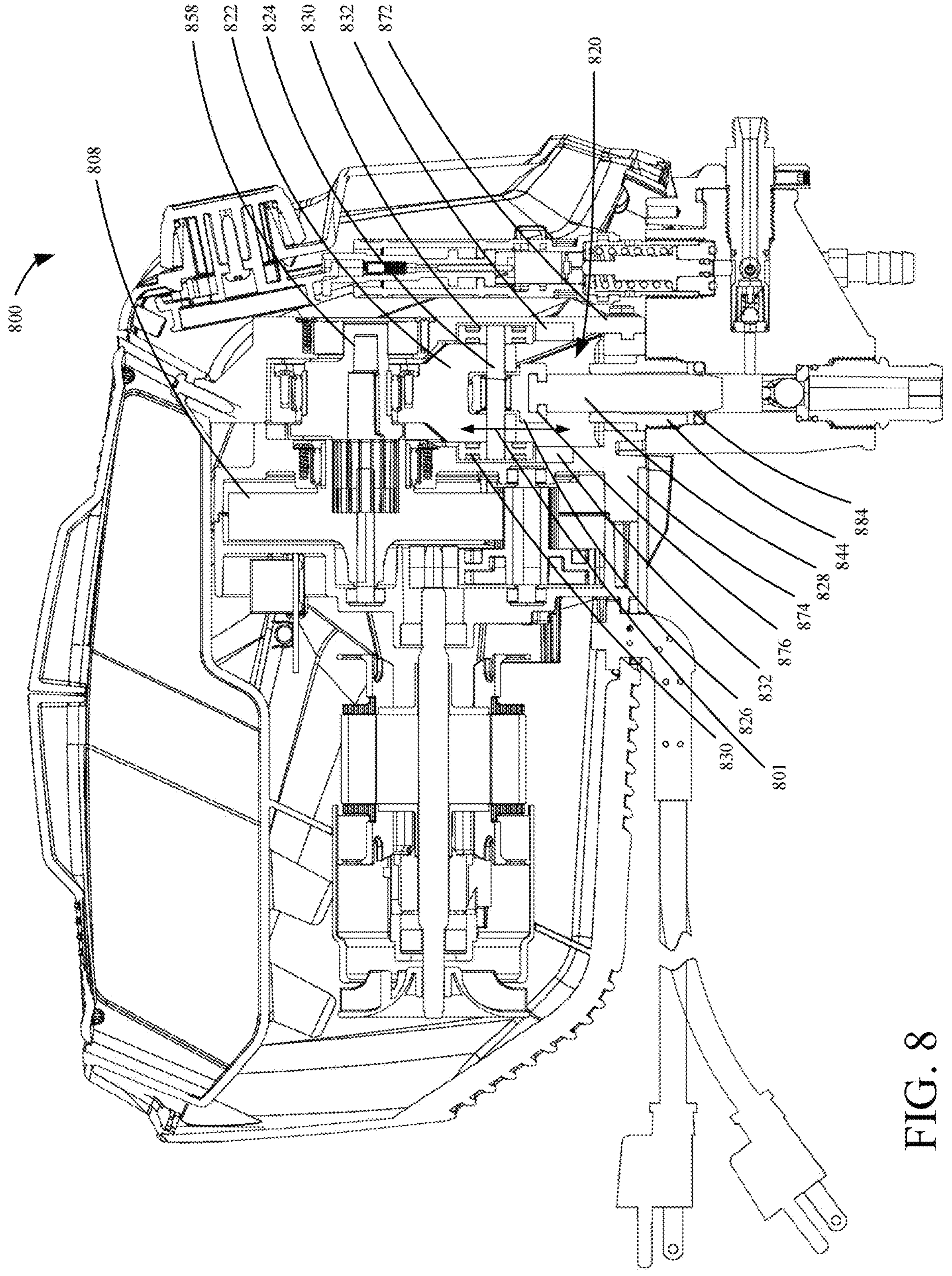
FIG. 8 is a side sectional view of a fluid delivery system that includes an alignment mechanism, in accordance with one embodiment.

FIG. 8 is a side sectional view of a fluid delivery system 800 that includes alignment mechanism (generally indicated by arrow 820), in accordance with one embodiment. In one embodiment, alignment mechanism 820 comprises the same or similar features discussed with respect to FIG. 3 (e.g. alignment mechanism 320). It is illustratively shown that some of the components discussed with respect to FIG. 3 are provided in FIG. 8 with corresponding reference numerals. For example, but not by limitation, reciprocating component 828 may include the same or similar features as reciprocating component 328, rotary component 822 may include the same or similar features as rotary component 322, alignment cavity 832 may include the same or similar features as alignment cavity 332, etc. As such, discussion of FIG. 3 and the interrelation of various components is hereby incorporated with reference to the interrelated features shown in FIG. 8. In one embodiment, it is illustratively shown that rollers 830 engage at least alignment cavity 832 to traverse along the vertical path generally indicated by double arrow 801.

Figure 9:
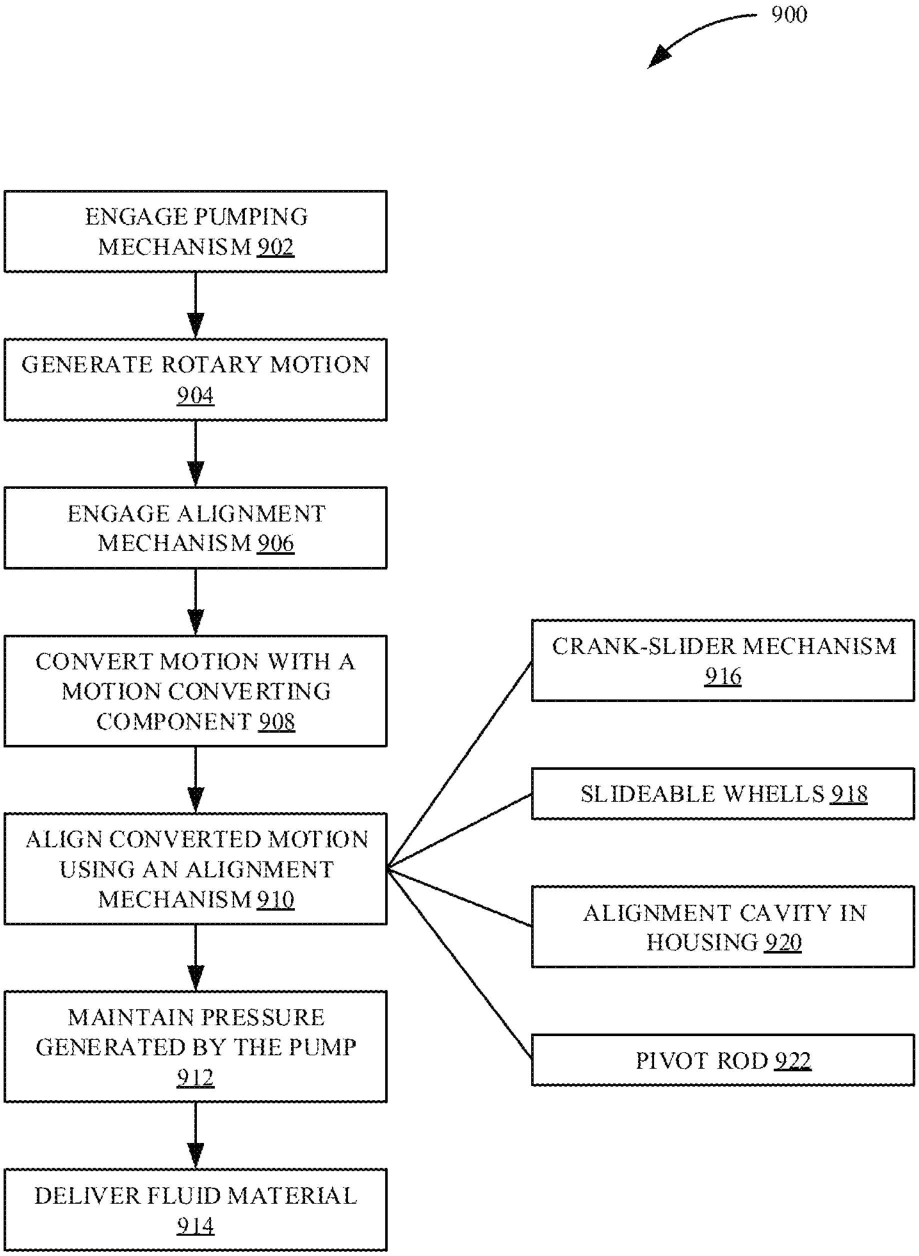
FIG. 9 shows a flow diagram of a method of aligning reciprocating motion in a fluid delivery system, in accordance with one embodiment.

FIG. 9 shows a flow diagram of a method 900 of aligning reciprocating motion in a fluid delivery system, in accordance with one embodiment. At block 902, it is illustratively shown that a pumping mechanism is engaged. In one embodiment, an operator engages an actuator to control operation of a motor that drives a fluid delivery system. For example, an operator engages motor controller 204 to initiate motor 206 and begin a fluid delivery operation. At block 904, a fluid delivery system generates rotary motion. In one embodiment, a motor is configured to generate rotary motion that is imparted to a rotary shaft. For example, motor 206 generates rotational motion and is coupled to rotary shaft 208 such that rotary shaft 208 rotates about an axis.

FIG. 9 further illustratively includes block 906, which generally shows that an alignment mechanism is engaged. In one embodiment, engaging an alignment mechanism comprises imparting rotational motion from a rotary component to the alignment mechanism. For example, rotary shaft 208 is coupled to rotary component 222 and imparts said motion to the rotary component to engage alignment mechanism 220. As such, engaging an alignment mechanism comprises generating at least some motion that is applied to the mechanism to facilitate fluid delivery during pumping, for example.

At block 908, method 900 illustratively comprises converting motion with a motion converting component. In one embodiment, block 908 comprises converting imparted rotational motion to reciprocating motion. For example, a fluid delivery system uses one or more components to generate translational motion from rotational motion that is provided by a motor. An alignment mechanism (e.g. alignment mechanism 220) utilizes one or more components (e.g. rotary component 222, pin 224, coupler 226, reciprocating component 228, etc.) to convert rotational motion from a rotary shaft (e.g. rotary shaft 208) to reciprocating motion that is applied to a pumping mechanism (e.g. pumping mechanism 240).

As discussed above, conventional systems may lose efficiency or damage parts when converting motion. However, embodiments described herein align converted motion using an alignment mechanism, for example, to prevent efficiency loss and damage to parts. This is generally indicated by block 910 of method 900. In one embodiment, aligning converted motion comprises utilizing a unique interaction of motion converting components with portions of a fluid delivery system to restrict variances in translational motion. In one embodiment, block 910 comprises a step of decreasing variances in motion of a reciprocating member (e.g. reciprocating component 228) as it travels along a substantially vertical plane during repeated up-stroke and down-stroke movements. To decrease variances, an alignment mechanism illustratively uses pivot rod 922 to couple crank slider-mechanism 916 with slidable wheels 918. Slidable wheels 918, in one embodiment, engage alignment cavity in housing 920 to confine movement of crank-slider mechanism 916. The confined range of motion of crank-slider mechanism 916, for example, provides a strict linear path for a reciprocating member (e.g. reciprocating component 228) to travel.

As such, method 900 also includes the step of maintaining pressure that is generated by a pumping mechanism. This is generally indicated at block 912. In one embodiment, in response to aligning converted motion in accordance with block 910, a pumping mechanism (e.g. pumping mechanism 240) maintains a consistent fluid pressure in a fluid path. As discussed above, consistent pressure of a fluid path is a desirable feature for a variety of fluid delivery systems as it allows for even spray patterns with decreased tailing or fading effects.

At block 914, it is illustratively shown that method 900 comprises delivering fluid material. In one embodiment, delivering fluid material comprises pressurizing a fluid material within a hydraulic cylinder (e.g. piston cylinder 244) and providing that pressurized fluid material to an outlet path. For example, the pressurized fluid material (e.g. paint) is delivered to a sprayer (e.g. sprayer 248). An operator may use sprayer 248, for example, to dispense the processed fluid to a variety of surfaces.

The descriptions of the various embodiments of the present disclosure have been presented for the purposes of illustration. These descriptions are not intended to be exhaustive or limited to the embodiments discussed herein.

What is claimed is:

1. A fluid delivery system comprising:

a motor configured to provide rotational motion about a first axis to an eccentric at a non-central location on the eccentric such that the eccentric rotates eccentrically about the first axis;

a rotary component having a first end and a second end, the first end having a first rolling bearing configured to receive the eccentric the second end having a first bore and a second bore, wherein the first bore and the second bore are configured to secure a pin;

an alignment mechanism comprising:

a housing comprising a first housing portion and a second housing portion separable from the first housing portion, the first housing portion having a first slot and the second housing portion having a second slot;

a first roller configured to be disposed within and move along a length of the first slot, the first roller having a first receiving portion;

a second roller configured to be disposed within and move along a length of the second slot, the second roller having a second receiving portion;

a pin having a first end and a second end, the first end configured to be inserted through the first bore and into the first receiving portion of the first roller and engage the first roller, the second end configured to be inserted through the second bore and into the second receiving portion of the second roller and engage the second roller, such that the pin can rotate while engaged with the first roller and the second roller; and a coupler comprising:

a second rolling bearing configured t receive the pin to movably couple the coupler to the pin, such that the pin extends through the coupler and the rotary component to detachably couple the coupler to the rotary component; and a receiving slot configured to receive a reciprocating component to moveably couple the reciprocating component to the coupler, the reciprocating component configured to reciprocate in a second axis transverse to the first axis and to move in the receiving slot along a third axis transverse to the second axis; and wherein the coupler is configured to move along the pin, in a fourth axis transverse to the third axis, between the first bore and the second bore of the rotary component.

2. The fluid delivery system of claim 1, wherein the first slot comprises a first blind slot and the second slot comprises a second blind slot that is opposite the first housing portion.

3. The fluid delivery system of claim 2, wherein the first blind slot and the second blind slot are sized to allow linear motion of the first and second roller substantially only along axes parallel to the third axis.

4. The fluid delivery system of claim 1, wherein the rotary component comprises a crank mechanism rotatably coupled to a gear assembly.

5. The fluid delivery system of claim 4, wherein the motor drives rotation of the gear assembly.

6. The fluid delivery system of claim 1, wherein each of the first and second rollers comprises a ball bearing configured to engage the first and second slots respectively.

7. The fluid delivery system of claim 1, wherein the alignment mechanism is configured to decrease a variance from a vertical plane that the reciprocating component travels during reciprocating motion.

8. The fluid delivery system of claim 1, wherein the receiving slot comprises a r-slot.

9. The fluid delivery system of claim 1, wherein the reciprocating component comprises a piston configured to pressurize a fluid in a hydraulic cylinder.

10. The fluid delivery system of claim 1, wherein the coupler movably couples to the reciprocating component such that the coupler can translate along a second direction lateral to the first axis.

11. The fluid delivery system of claim 1, wherein the coupler directly couples to the reciprocating component.

12. The fluid delivery system of claim 1, wherein the coupler is positioned near a bottom surface of the rotary component.

13. The fluid delivery system of claim 1, wherein the pin is configured to extend past the rotary component when extended through at least the length of the coupler and the rotary component.

14. A fluid delivery system, comprising:

a rotary component, having a first portion and a second portion, the first portion of the rotary component pivotally engaged with a rotational motion component and the second portion having a first bore and a second bore;

a coupler configured to couple the second portion of the rotary component to a reciprocal piston such that the rotary component converts rotational motion of the rotational motion component to reciprocal motion of the reciprocal piston;

an alignment mechanism disposed at least partially in a plastic housing, configured to engage the coupler and reduce non-reciprocal motion of a portion of the coupler that couples to the reciprocal piston, wherein the alignment mechanism comprises:

an alignment cavity formed in the plastic housing, the alignment cavity having a first slot and a second slot;

a first roller that engages the first slot of the alignment cavity, the first roller having a first receiving portion;

a second roller that engages the second slot of the alignment cavity, the second roller having a second receiving portion;

a pin having a first end and a second end, the first end configured to be inserted into the first receiving portion of the first roller and engage the first roller, and the second end configured to be inserted into the second receiving portion of the second roller and engage the second roller, the pin being further configured to extend through at least a length of the coupler and the rotary component and engage the coupler such that the coupler can translate along the pin and the pin can rotate within the coupler, wherein the pin engages one or more of the coupler and rotary component via a rolling bearing;

wherein the first receiving portion and the second receiving portion are sized larger than the pin such that the pin can rotate while inserted into the first receiving portion and the second receiving portion and engaged with the first roller and the second roller; and wherein the pin engages the rotary component at the first bore on one side of the coupler and at the second bore on an opposing side of the coupler such that the coupler can translate along the pin between the first bore and the second bore; and wherein the reciprocal piston is configured to pressurize fluid in a reciprocating piston pump cylinder.

15. The fluid delivery system of claim 14, wherein the alignment mechanism reduces a side load on the reciprocal piston.

16. A paint delivery system comprising:

a motor having a driveshaft that rotates;

a housing that is in a substantially fixed relationship with the motor;

an eccentric that is rotationally driven by the driveshaft eccentrically;

a rotary component having a first end and a second end, the first end having a first roller bearing and the second end having a first bore and a second bore, wherein the first end is configured to that couple to the eccentric via the first roller bearing, and is linearly driven by the eccentric in more than one direction;

an alignment mechanism that couples the rotary component to a reciprocating component, wherein the alignment mechanism translates substantially only linear movement of the rotary component to the reciprocating component such that the reciprocating component moves along a first axis, the alignment mechanism comprising:

a coupler that movably couples to the rotary component such that the coupler can translate relative to the rotary component along a second axis that is lateral to the first axis, the coupler having a slot that couples to the reciprocating component, the slot having a self-centering mechanism that allows the coupler to translate relative to the reciprocating component along a third axis that is lateral to the first axis and different from the second axis to align the reciprocating component with the coupler; and a pin that is received by the first bore of the second end of the rotary component such that the pin can extend through at least a length of the coupler and the second bore of the second end of the rotary component, and rotate within the coupler, wherein translational movement of the pin is restricted to movement along the first axis; and wherein the reciprocating component couples to a piston of a reciprocating piston paint pump.

17. The paint delivery system of claim 16, wherein translational movement of the pin is restricted to movement along the first axis by a roller coupled to the pin.

18. The paint delivery system of claim 17, wherein the roller is disposed within a housing slot of the housing.

19. The paint delivery system of claim 18, wherein the eccentric and the rotary component are disposed within the housing.

20. The paint delivery system of claim 16, wherein the alignment mechanism reduces side loading of the reciprocating component on the piston.

* * * * *